United States Patent

[11] 3,633,254

| [72] | Inventors | Edward Hoglund<br>1020 Lois Avenue, Park Ridge, Ill. 60068;<br>Bertil Stade, 480 Krollwood Drive, Wood Dale, Ill. 60191 |
|---|---|---|
| [21] | Appl. No. | 49,867 |
| [22] | Filed | June 25, 1970 |
| [45] | Patented | Jan. 11, 1972 |

[54] PIPE CLAMP
11 Claims, 10 Drawing Figs.

| [52] | U.S. Cl. | 24/276 |
|---|---|---|
| [51] | Int. Cl. | B65d 63/00 |
| [50] | Field of Search | 24/275–277;<br>285/420 |

[56] References Cited
UNITED STATES PATENTS

| 3,340,581 | 9/1967 | Engman et al. | 24/276 |
|---|---|---|---|
| 909,200 | 1/1909 | Morgan | 24/276 |
| 1,481,674 | 1/1924 | Barnes | 24/276 |
| 2,959,834 | 11/1960 | Graham et al. | 24/277 |

*Primary Examiner*—Donald A. Griffin
*Attorney*—Silverman & Cass

ABSTRACT: A pipe clamp formed of two parts, one being a heavy wire provided with a hook at one end and having the other end threaded, a sheet metal coupling of generally channel-shaped cross section having a first opening adjacent one end for the hook and a second opening generally adjacent the opposite end, the threaded end being straight and passing through the second opening, the coupling having a surface formed thereon which is arranged at an acute angle relative to its length, and the straight portion being angled to pass through the surface so that the hook and straight end are angularly quite close together, constriction being effected at a tangent less than 90° relative to the principal surface of the coupling, and the coupling having inner edges of arcuate configuration to engage the pipes being connected together.

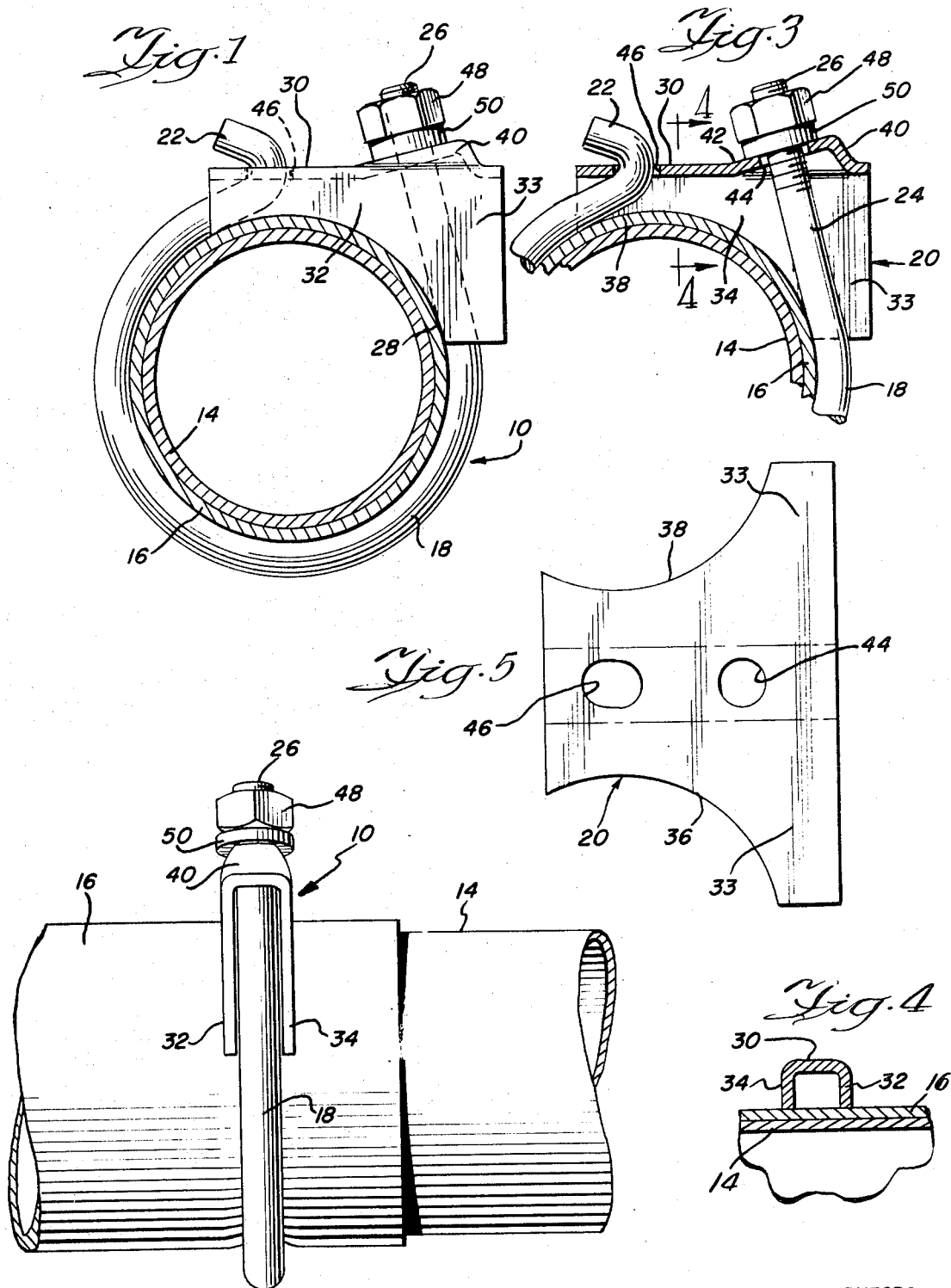

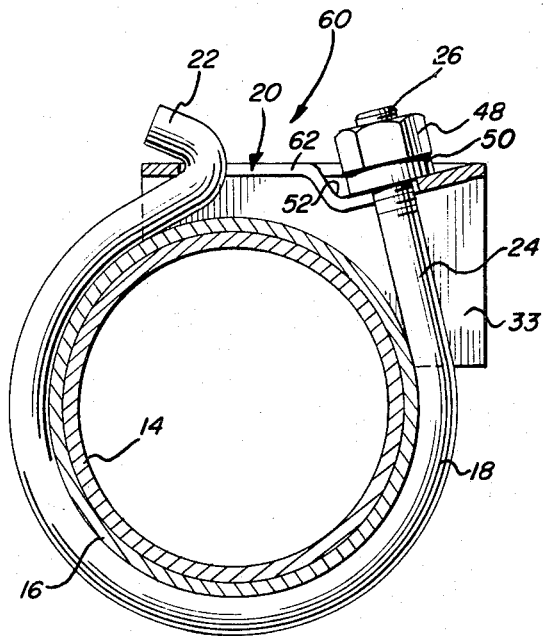
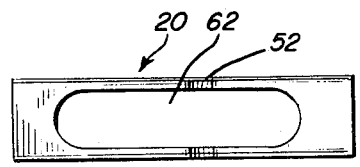
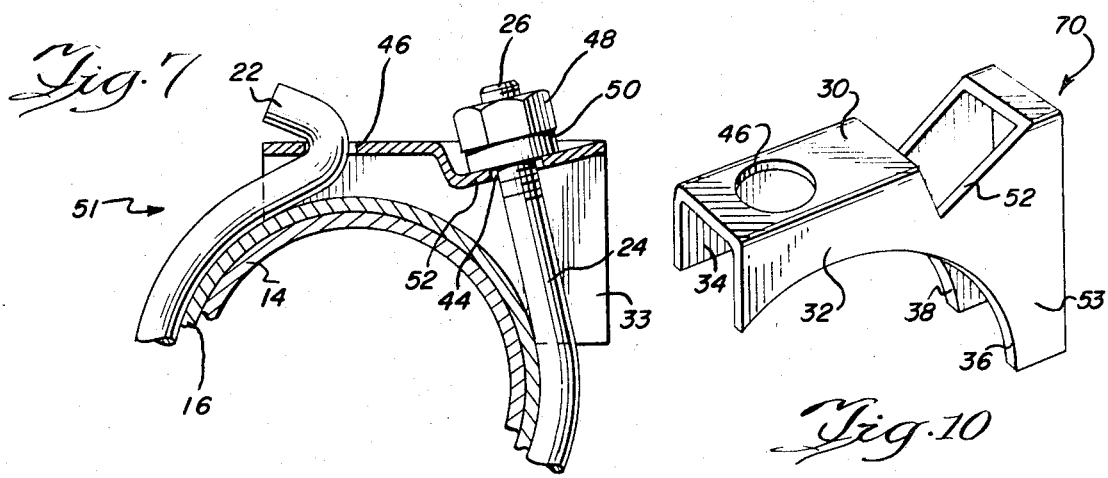
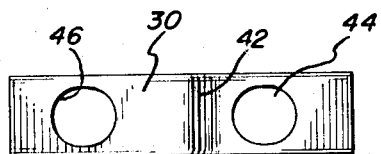

PIPE CLAMP

FIELD OF THE INVENTION

The field of the invention is pipe clamps, and especially heavy duty pipe clamps as for example those which are intended to connect telescoping pipe members of an exhaust system, one of the most important requirements of such structure being its ability to seal the connection.

Generally, pipe clamps of this type are known, in which there is an arcuate wire member that has one end connected to a coupling member, the other end passing through the coupling member and being threaded and held in place by a nut. Examples of this type of structure are shown in U.S. Pat. No. 3,340,581 and No. 3,109,215. In the known type of structure, the coupling member has its sidewalls arcuate to provide the engagement against the telescoping pipe joint bridging the ends of the wire member. In one patent, namely U.S. Pat. No. 2,959,834, both ends are threaded and there are two nuts engaging the same with the coupling member being almost semicircular.

The prior devices, where not complicated by expensive structure, have not been successful in providing a complete seal all the way around the telescoped joint. In the case of the modern internal combustion engine, especially where there are catalytic means in the muffler, it is important that there be no polluting leakage because the engine and the muffler, and further it is important that there be no leakage between the engine and the exhaust point which could find its way into the passenger compartment.

The invention provides a simplified and effective means for promoting a substantial seal fully around the clamped joint by bringing the two ends of the wire member as close together as feasible during their force-applying condition, especially by providing a coupling which is quite short and not depended upon for clamping along as much of its length as in prior structures.

SUMMARY OF THE INVENTION

According to the invention, there is a wire member that has a hook formed at one end and a straight threaded portion at the other end. The coupling member is of channel-shaped configuration with the walls of the channel forming an arcuate quadrant to engage the pipe and having its web provided with means to engage the hook at one end and the straight portion at the other end. Furthermore, the wall of the channel web is either deformed or cut away to provide an angled shoulder through which the straight portion protrudes and which supports the nut and washer that are used to take up on the clamp. The tangential point of engagement of the pipe joint with the wire member is substantially less than 90° from the point of engagement of the straight portion with the coupling member so that the two wire ends are quite close together and exert a greater constricting force on the joint than with prior structures. The angled connection of the straight portion with the web pulls the two ends of the wire member toward one another instead of tending to cause them to spread, thus applying a higher constricting force than in prior devices.

SHORT DESCRIPTION OF THE DRAWINGS

FIG. 1 is a side elevational view of a pipe clamp constructed in accordance with the invention, shown engaged upon a telescoping pipe joint.

FIG. 2 is a fragmentary edge-on elevational view of the pipe clamp of FIG. 1.

FIG. 3 is a fragmentary median sectional view of the pipe clamp of FIG. 1.

FIG. 4 is a sectional view taken through the clamp along the line 4—4 of FIG. 3 and in the indicated direction.

FIG. 5 is a developed view of the blank from which the coupling member of the pipe clamp of FIG. 1 is made.

FIG. 6 is a top plan view of the coupling member of FIG. 1 with the wire member not shown.

FIG. 7 is a view similar to that of FIG. 3 but showing a modified form of the invention.

FIG. 8 is a view similar to that of FIG. 7 but showing still another modified form of the pipe clamp.

FIG. 9 is a view similar to that of FIG. 6 but showing the coupling member of FIG. 8.

FIG. 10 is a perspective view of a coupling member of still another modified form of the invention.

DESCRIPTION OF THE PREFERRED EMBODIMENTS

In the drawings the reference character 10 designates a pipe clamp constructed in accordance with the invention for clamping together a pair of telescoped tubes such as shown at 14 and 16. The clamp 10 is comprised of two parts, one of which is called the wire member 18 and the other of which is referred to as the coupling member 20.

The wire member 18 has a hook formation 22 at one end and a straight formation 24 at the other end that terminates in a threaded part 26. It will be seen especially from FIGS. 1 and 3 that the point of tangency 28 of the wire member 18 with the pipe joint 14, 16 is less than 90° from the plane of the top surface 30 of the coupling member 20.

The coupling member 20 is of channel-shape configuration and comprises a top portion or web 30 and two sidewalls 32, 24 which straddle the ends 22 and 24 of the wire member. The sidewalls 32 and 34 are provided with arcuate edges 36 and 38 intended to engage upon the outer one of the telescopic pair of pipes 14 and 16. A cross section of the coupling member 20 at its narrowest point shows the channel configuration in FIG. 4. At one end of the coupling member the sidewalls are enlarged to provide a generally triangular formation 33 which strengthens that end of the coupling member.

In a preferred form of the invention, there is an embossed ridge 40 formed in the upper right-hand portion of the web 30 and this ridge provides what may be termed a shoulder 42 that is perforated as shown at 44 to receive the threaded part 26 of the straight portion 24 of the wire member 18. A second perforation which may be in the form of an oval slot 46 is provided in the other end of the web 30 to be engaged by the hook 22 and to permit pivoting of the wire member during the assembly of the joint. In assembling the said joint, a nut 48 and washer 50 engage over the shoulder 42 and are tightened. It has been found that this angular shoulder 42 enables the two ends 22, 24 to approach quite closely and in cooperation with the edges 36 and 38 provides a complete seal of radial pressure around the joint 14, 16. There is no tendency of these ends to spread apart, which is characteristic of other devices.

The simplicity of the device is apparent when one considers that the coupling member 20 is formed of a single stamping, blanked and formed from the structure illustrated in FIG. 5.

FIG. 6 illustrates a top view of the coupling member 20 to show the location of the two openings 44, 46 after the coupling member has been formed.

In FIG. 7 there is illustrated a sectional view through another form of the invention which may be designated by the reference character 51. In this case, the shoulder 52 is formed by impressing or embossing inwardly and in all other respects the structure is the same and hence the same character references are used throughout. It is also possible to provide still another form of the invention as shown in FIGS. 8 and 9 in which there is a single slot 62 which takes the place of both slots and in all other respects said structure 60 is the same structure as 51.

In FIG. 10 there is illustrated a different form of coupling member 70 which is the equivalent of those illustrated in FIGS. 7 and 8, and is a similarly modified form of the structure of FIGS. 1 and 3. In this case, the shoulder 52 is formed by what appears to be a simple cutting away of the coupling member on an angle downwardly as shown. Obviously, this structure may be punched in the blank before forming. In operation, the coupling member 70 is the same as all illustrated previously.

It will be appreciated that variations may be made in the invention without departing from the spirit and scope of the same as defined in the appended claims.

What it is desired to secure by Letters Patent of the United States is:

1. A clamp for a pipe joint comprising two parts, one of which comprises a substantially circular wire member having a hook at one end and a straight portion with a threaded tip at the other end, and the second of which comprises a coupling member of channel formation having a web and sidewalls, the sidewalls having arcuate edges to engage the pipe joint when the clamp is assembled thereon, the web having the hook engaged through one end of the web, and having the threaded tip of the straight portion engaged through the other end of the web, the straight portion being angled toward the hook at the point where it passes through the web whereby the point of tangency of the straight portion with the pipe joint is less than 90° from the web of the coupling member, and threaded nut means engaging said threaded tip to take up the wire member upon said joint with said opposite ends spaced from each other.

2. The clamp as claimed in claim 1 in which there are openings in the web at opposite ends thereof to accommodate said hook and straight portion, respectively.

3. The clamp as claimed in claim 2 in which there is an angled shoulder formed in the web and said shoulder is in the form of a boss embossed upwardly out of said web with the opening at that end of the web in the center of said boss.

4. The clamp as claimed in claim 1 in which there is an elongate slot in the said web and the hook engages one end of the slot while the straight portion passes through the other end of the slot.

5. The clamp as claimed in claim 4 in which there is an angled shoulder formed in the web and said shoulder is below the surface of the web at the said other end of the slot.

6. A clamp for a pipe joint comprising two parts, one of which comprises a substantially circular wire member having a hook at one end and a straight portion with a threaded tip at the other end, and the second of which comprises a coupling member of channel formation having a web and sidewalls, the sidewalls having arcuate edges to engage the pipe joint when the clamp is assembled thereon, the web having the hook engaged through one end of the web, and having the threaded tip of the straight portion engaged through the other end of the web, the straight portion being angled toward the hook at the point where it passes through the web whereby the point at which the straight portion is tangent to the pipe joint it is adapted to engage is less than 90° from the web of the coupling member, threaded nut means engaging said threaded tip to take up the wire member upon said joint and there is an angled shoulder formed in the web at the point where the straight portion passes through said web, and during the taking up of the wire member, the nut means engages upon said angled shoulder.

7. The clamp as claimed in claim 6 in which said shoulder is in the form of a boss, embossed upwardly out of said web.

8. The clamp as claimed in claim 6 in which said shoulder is below the surface of the web.

9. A clamp for clamping the pipes of a telescoped joint together, comprising two parts, one part consisting of a generally circular wire member having a hook formation at one end and a straight portion with a threaded tip at the other end, the wire member having an open side providing a space between the straight end and the hook formation which is somewhat less than 90° in extent, said space being closed by the second part which consists of a coupling member, the said coupling member comprising a channel formation having a web and lateral sidewalls, the lateral sidewalls having arcuate edges to follow the contours of the wire to form a circle therewith, the web of the coupling member having an opening at one end and the hook formation being engaged therein, and a second opening at the other end with the straight portion extending therethrough, the configuration of parts being such that the straight portion passes through the web at an angle other than 90° and is canted toward the hook formation, the web having an angled shoulder integral therewith at the second opening, there being threaded nut means engaged with the threaded top and bearing upon the shoulder when the clamp is being taken up to constrict the same upon said joint.

10. The clamp as claimed in claim 9 in which said angled shoulder is embossed from the surface of said web.

11. The clamp as claimed in claim 9 in which there is an enlarged triangular formation integral with said lateral sidewalls straddling said straight portion.

* * * * *